(12) United States Patent
Hayashi et al.

(10) Patent No.: US 12,081,875 B2
(45) Date of Patent: Sep. 3, 2024

(54) IMAGE PROCESSING APPARATUS, IMAGE PROCESSING METHOD, AND COMPUTER READABLE MEDIUM

(71) Applicant: JVCKENWOOD Corporation, Yokohama (JP)

(72) Inventors: Keita Hayashi, Yokohama (JP); Hirofumi Yamamoto, Yokohama (JP); Tadashi Ishiwata, Yokohama (JP); Yasufumi Nakaaki, Yokohama (JP); Keiji Tsuchiya, Yokohama (JP); Jun Takahashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 225 days.

(21) Appl. No.: 17/940,836

(22) Filed: Sep. 8, 2022

(65) Prior Publication Data
US 2023/0007158 A1 Jan. 5, 2023

Related U.S. Application Data

(63) Continuation of application No. PCT/JP2021/008946, filed on Mar. 8, 2021.

(30) Foreign Application Priority Data

Jul. 22, 2020 (JP) .................................. 2020-125148

(51) Int. Cl.
*H04N 23/72* (2023.01)
*G01J 5/00* (2022.01)
(Continued)

(52) U.S. Cl.
CPC ................. *H04N 23/72* (2023.01); *G01J 5/10* (2013.01); *H04N 17/002* (2013.01); *H04N 23/71* (2023.01); *G01J 2005/0077* (2013.01)

(58) Field of Classification Search
None
See application file for complete search history.

(56) References Cited

U.S. PATENT DOCUMENTS 10,165,194 B1* 12/2018 Baldwin .................... G06T 5/94
2016/0057369 A1* 2/2016 Wolfe ........................ G01J 1/46
348/322

(Continued)

FOREIGN PATENT DOCUMENTS

CN 110274694 A 9/2019
JP 2009005120 A 1/2009

*Primary Examiner* — Edwin C Gunberg
(74) *Attorney, Agent, or Firm* — Procopio, Cory, Hargreaves & Savitch LLP

(57) ABSTRACT

In an image processing apparatus, a first correction unit corrects imaging data acquired from an infrared imaging device, based on a first correction table, and outputs first corrected data. A second correction unit generates a second correction table for the imaging data in a state in which a shutter is closed, and outputs second corrected data based on the second correction table. A saturated region detection unit detects a saturated region in the imaging data. A shutter control unit performs closing control for the shutter, based on a result of detection of the saturated region. An abnormal pixel detection unit detects whether or not the imaging data acquired in the state in which the shutter is closed includes an abnormal pixel. A selection unit selects and outputs either the first corrected data or the second corrected data in accordance with a result of detection by the abnormal pixel detection unit.

5 Claims, 7 Drawing Sheets

(51) Int. Cl.
*G01J 5/10* (2006.01)
*H04N 17/00* (2006.01)
*H04N 23/71* (2023.01)

(56) References Cited

U.S. PATENT DOCUMENTS

2018/0096468 A1* 4/2018 Nguyen .................. H04N 5/33
2022/0377263 A1* 11/2022 Hayashi .................. H04N 5/33

* cited by examiner

IMAGE PROCESSING APPARATUS, IMAGE PROCESSING METHOD, AND COMPUTER READABLE MEDIUM

CROSS REFERENCE TO RELATED APPLICATION

The present application is based upon and claims the benefit of priority from Japanese Patent Application No. 2020-125148, filed on Jul. 22, 2020, the disclosure of which is incorporated herein in its entirety by reference.

BACKGROUND

The present invention relates to an image processing apparatus, an image processing method, and a non-transitory computer readable medium.

A large number of object detection systems using infrared cameras that detect the heat of an object have been developed. Further, it is expected that such an object detection system will be used, for example, to improve the safety of an automobile. Meanwhile, because of the characteristics of the infrared camera that detects the heat of an object, an abnormality may occur in a microbolometer used as an imaging device when an image of sunlight is captured. Therefore, there is a demand for a technology to reduce the effects of sunlight.

For example, in the far-infrared imaging apparatus disclosed in Japanese Unexamined Patent Application Publication No. 2009-005120, it is determined whether or not the quantity of far-infrared rays detected using far-infrared ray detection pixels is equal to or greater than a first quantity, and a shutter is closed when there is a far-infrared ray detection pixel in which the quantity of far-infrared rays detected is equal to or greater than the first quantity. Meanwhile, after the shutter is closed, it is determined for each far-infrared ray detection pixel whether or not the quantity of far-infrared rays detected is less than a second quantity that is smaller than or equal to the first quantity, and the shutter is opened when the quantity of far-infrared rays detected for each of all the far-infrared ray detection pixels is less than the second quantity.

SUMMARY

The above-described infrared imaging apparatus is used with a reduced dynamic range in order to improve the resolution for object detection. In such a case, a detection signal is saturated even in a temperature range in which an abnormality does not occur in the microbolometer. Therefore, the infrared imaging apparatus may close the shutter more than necessary to protect the microbolometer. The object detection function cannot be used during the period when the shutter is closed. Incidentally, the microbolometer performs calibration (imaging data correction) in order to prevent the accuracy of temperature detection from being degraded. One of typical methods of calibration adjusts the output of the microbolometer in the state in which a mechanical shutter, or a blackbody, is closed (what is called mechanical shutter correction). The mechanical shutter correction includes a process of periodically or intermittently closing the shutter. Therefore, while the shutter is closed, the temperature of an object cannot be detected. Another method of calibration uses no shutter and adjusts output by a preset algorithm (what is called shutterless correction). The shutterless correction is not required to close the shutter for calibration. However, when sunlight enters the microbolometer, the output corresponding to a part having received sunlight becomes an abnormal value. When an abnormal value occurs in the microbolometer, the remediation requires a long time. Therefore, the part outputting an abnormal value cannot correctly detect the temperature of an object. The image processing apparatus and the like that use the microbolometer have a problem as described above.

The present disclosure has been made in order to solve the above-described problem, and an object thereof is to provide an image processing apparatus and the like that reduce image quality degradation and reduce interruption of the sensor function.

An image processing apparatus according to the present embodiment includes a first correction unit, a second correction unit, a saturated region detection unit, a shutter control unit, an abnormal pixel detection unit, and a selection unit. The first correction unit corrects imaging data acquired from an infrared imaging device that captures a thermal image outside of a mobile body, based on a preset first correction table, and outputs first corrected data having been corrected. The second correction unit generates a second correction table for the imaging data in a state in which a shutter is closed, and outputs second corrected data having been corrected based on the generated second correction table. The saturated region detection unit detects that a saturated region is present in the imaging data. The shutter control unit periodically or intermittently performs closing control for the shutter for calibrating the second correction table, in order to protect the infrared imaging device based on a result of detection of the saturated region. The abnormal pixel detection unit detects whether or not the imaging data acquired in the state in which the shutter is closed includes an abnormal pixel pertaining to a pixel having a luminance value exceeding a preset threshold, in the first corrected data. The selection unit selects and outputs either the first corrected data or the second corrected data in accordance with a result of detection by the abnormal pixel detection unit.

An image processing method according to the present embodiment includes a first correction step, a second correction step, a saturated region detection step, a shutter control step, an abnormal pixel detection step, and a selection step. The first correction step corrects imaging data acquired from an infrared imaging device that captures a thermal image outside of a mobile body, based on a preset first correction table, and outputs first corrected data having been corrected. The second correction step generates a second correction table for the imaging data in a state in which a shutter is closed, and outputs second corrected data having been corrected based on the generated second correction table. The saturated region detection step detects that a saturated region is present in the imaging data. The shutter control step periodically performs closing control for the shutter for calibrating the second correction table, in order to protect the infrared imaging device based on a result of detection of the saturated region. The abnormal pixel detection step detects whether or not the imaging data acquired in the state in which the shutter is closed includes an abnormal pixel pertaining to a pixel having a luminance value exceeding a preset threshold, in the first corrected data. The selection step selects and outputs either the first corrected data or the second corrected data in accordance with a result of detection in the abnormal pixel detection step.

A program according to the present embodiment causes a computer to execute the following image processing method. The image processing method according to the present embodiment includes a first correction step, a second correction step, a saturated region detection step, a shutter control step, an abnormal pixel detection step, and a selection step. The first correction step corrects imaging data acquired from an infrared imaging device that captures a thermal image outside of a mobile body, based on a preset first correction table, and outputs first corrected data having been corrected. The second correction step generates a second correction table for the imaging data in a state in which a shutter is closed, and outputs second corrected data having been corrected based on the generated second correction table. The saturated region detection step detects that a saturated region is present in the imaging data. The shutter control step periodically performs closing control for the shutter for calibrating the second correction table, in order to protect the infrared imaging device based on a result of detection of the saturated region. The abnormal pixel detection step detects whether or not the imaging data acquired in the state in which the shutter is closed includes an abnormal pixel pertaining to a pixel having a luminance value exceeding a preset threshold, in the first corrected data. The selection step selects and outputs either the first corrected data or the second corrected data in accordance with a result of detection in the abnormal pixel detection step.

According to the present embodiment, it is possible to provide an image processing apparatus and the like that reduce the image quality degradation and reduce interruption of the sensor function.

DETAILED DESCRIPTION

The present invention will be described hereinafter through embodiments of the present invention. However, the following embodiments are not intended to limit the scope of the invention according to the claims. Further, all the components described in the embodiments are not necessarily indispensable as means for solving the problem. For the clarification of the description, the following descriptions and the drawings are partially omitted and simplified as appropriate. Note that the same elements are denoted by the same reference symbols throughout the drawings, and redundant descriptions are omitted as necessary.

First Embodiment

Figure 1:
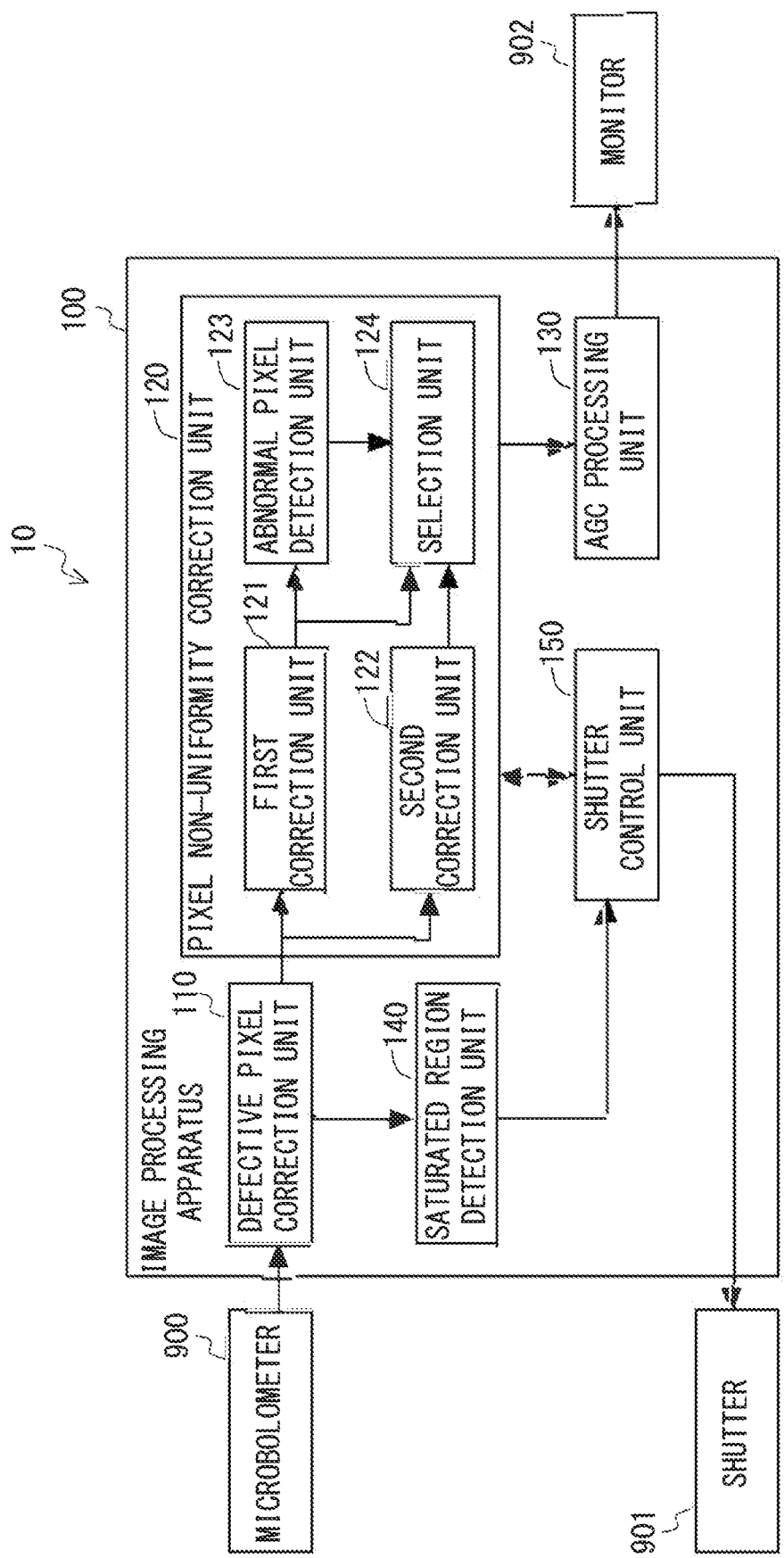
FIG. 1 is a block diagram of an image processing apparatus according to a first embodiment.

Embodiments of the present invention will be described hereinafter with reference to the drawings. FIG. 1 is a block diagram of an image processing apparatus according to a first embodiment. An image processing apparatus 100 shown in FIG. 1 is a component of a thermal image display system 10 that captures a thermal image outside of an automobile and displays it on a monitor. The thermal image display system 10 mainly includes the image processing apparatus 100, a microbolometer 900, a shutter 901, and a monitor 902.

The image processing apparatus 100 will be described below. The image processing apparatus 100 includes an arithmetic unit such as a Central Processing Unit (CPU) or a Micro Controller Unit (MCU). Further, the image processing apparatus 100 includes, in addition to the aforementioned arithmetic unit, at least a non-volatile or a volatile memory such as a flash memory or a Dynamic Random Access Memory (DRAM), and a control board comprising other electric circuits. In the image processing apparatus 100, programs are installed in the aforementioned arithmetic unit and the like, and the following functions are implemented by a combination of software and hardware.

The image processing apparatus 100 acquires imaging data of a thermal image captured by the microbolometer 900, and performs preset processing on the acquired imaging data. The image processing apparatus 100 outputs the imaging data on which it has performed the preset processing to the monitor 902. The image processing apparatus 100 mainly includes a defective pixel correction unit 110, a pixel non-uniformity correction unit 120, an Auto-Gain-Control (AGC) processing unit 130, a saturated region detection unit 140, and a shutter control unit 150. The image processing apparatus 100 may include a recognition processing unit that recognizes a person or the like based on a thermal image captured by the microbolometer 900.

The defective pixel correction unit 110 receives imaging data from the microbolometer 900 and corrects data having defective pixels included in the imaging data. For example, the defective pixel correction unit 110 detects the coordinates of the defective pixels in a state in which the shutter is closed, and stores the detected coordinates of the defective pixels. Further, the defective pixel correction unit 110 corrects the stored data of the defective pixels by generating interpolation data from data of the adjacent pixels. The defective pixel correction unit 110 supplies the corrected imaging data to each of the pixel non-uniformity correction unit 120 and the saturated region detection unit 140.

The pixel non-uniformity correction unit 120 corrects the pixel non-uniform state in the imaging data received from the defective pixel correction unit 110, and supplies the corrected imaging data to the AGC processing unit 130. The pixel non-uniformity correction unit 120 mainly includes a first correction unit 121, a second correction unit 122, an abnormal pixel detection unit 123 and a selection unit 124.

The first correction unit 121 corrects the imaging data received from the defective pixel correction unit 110, and supplies first corrected data that is corrected imaging data to the abnormal pixel detection unit 123 and the selection unit 124. The correction performed by the first correction unit 121 is what is called shutterless correction. That is, the first correction unit 121 generates the first corrected data by correcting the imaging data, based on a preset first correction table and a gain correction table. A specific example of the shutterless correction will be described later.

The second correction unit generates a second correction table for the imaging data in the state in which the shutter 901 is closed, and supplies the selection unit 124 with second corrected data that is imaging data corrected in accordance with the generated second correction table and the preset gain correction table. The correction performed by the second correction unit 122 is what is called mechanical shutter correction.

The above-described gain correction table is a correction table preset to correct the gain for the imaging data. The gain correction table is generated by, for example, two point correction, linear interpolation, least-squares method, non-linear interpolation, etc.

To achieve the above-described functions, the second correction unit 122 monitors a condition for calibrating the second correction table. The calibration condition is preset, and is for a case in which the temperature at the vicinity of the microbolometer exceeds a predetermined range, for example. Another example of the correction condition is for a case in which a preset period elapses after the latest mechanical shutter correction. The output of the microbolometer may be drifted as time elapses, and the detection accuracy may be reduced. Therefore, when the condition for performing the mechanical shutter correction is satisfied, the second correction unit 122 issues an instruction that the shutter is to be closed, to the shutter control unit 150.

When the second correction unit 122 receives the imaging data in the state in which the shutter is closed, it updates the second correction table, based on the luminance value of the imaging data in the state in which the shutter is closed. The second correction unit 122 then corrects the imaging data using the calibrated second correction table and the gain correction table. Note that, for example, the second correction table is calibrated in accordance with the imaging data and the gain correction table.

The abnormal pixel detection unit 123 receives the first corrected data in a state in which the shutter 901 is closed, and detects whether or not the received first corrected data includes an abnormal pixel pertaining to a pixel having a luminance value exceeding a preset threshold. The abnormal pixel detection unit 123 supplies the selection unit 124 with a signal about a result of detection.

Here, the abnormal pixel is, for example, a pixel indicating a luminance value exceeding a preset threshold in imaging data in the state in which the shutter 901 is closed. The luminance value exceeding the preset threshold is a value equal to or greater than 100 in a case in which the luminance value is indicated in 16384-gradation levels from 0 to 16383, for example. The imaging data in the state in which the shutter 901 is closed has been acquired by capturing the shutter, which is a blackbody. Accordingly, when there is no abnormality, the differences between the luminance values of adjacent pixels in the first corrected data have values of zero or close to zero. However, when sunlight enters the microbolometer, pixel data on pixels receiving the sunlight come into an abnormal state. The differences between the luminance values of the pixels in the abnormal state and the luminance values of the pixels in a not abnormal state do not have a value of zero or close to zero. In this case, the pixel data on pixels receiving the sunlight has values acquired by offsetting a predetermined luminance value.

A case in which a state of pixel data is changed from a normal state to an abnormal state will be described below. When the microbolometer 900 captures an image of the sun, the luminance value of each of the pixels in the region in which an image of the sun is captured reaches the upper limit and becomes saturated. In general, the microbolometer 900 is designed so that an upper limit of the dynamic range is, for example, 200 degrees. In this case, even when the dynamic range is set to 200 degrees, which is the upper limit, the pixels in which an image of the sun is captured are saturated. At this time, a state of the imaging device that has captured an image of the sun is changed from a normal state to an abnormal state in which it cannot correctly output a signal. Further, it is known that it takes a certain amount of time for the imaging device in an abnormal state to return to a normal state even after it is protected from sunlight by closing the shutter.

The preset threshold that is set in the abnormal pixel detection unit 123 may be set so that the above-described pixel indicating the predetermined luminance value is equal to or greater by 5% than the average value of the entire image, for example. The abnormal pixel detection unit 123 generates a signal indicating whether to include any abnormal pixel or not, as the signal about the result of detection, in the condition set as described above.

Note that the abnormal pixel detection unit 123 receives information about an opened/closed state of the shutter 901, from the shutter control unit 150. Therefore, the abnormal pixel detection unit 123 can recognize whether the shutter 901 is in an opened state or a closed state for each imaging data item supplied from the first correction unit 121. Note that the imaging data may include information indicating whether the data has been generated in the opened state of the shutter 901 or in the closed state of the shutter 901. In this case, the abnormal pixel detection unit 123 can detect the opened/closed state of the shutter 901 from the information included in the imaging data, for each imaging data item received from the first correction unit 121.

The selection unit 124 receives the imaging data having been subjected to the shutterless correction, from the first correction unit 121, and receives the imaging data having been subjected to the mechanical shutter correction, from the second correction unit 122. Furthermore, the selection unit 124 receives a signal about a result of detection of the abnormal pixel, from the abnormal pixel detection unit 123. The selection unit 124 selects either the first corrected data or the second corrected data in accordance with the result of detection received from the abnormal pixel detection unit 123, and outputs the selected imaging data to the AGC processing unit 130.

The selection unit 124 may select the first corrected data or the second corrected data in accordance with whether or not the number of abnormal pixels included in the first corrected data in the imaging data captured in the state in which the shutter 901 is closed exceeds a threshold or not. In this case, the selection unit 124 may select the first corrected data or the second corrected data in accordance with whether or not the abnormal pixels are adjacent to each other and the number of abnormal pixels adjacent to each other exceeds the threshold.

According to the above-described configuration, when abnormal pixels with reference to the preset condition are detected in the first corrected data in the state in which the shutter 901 is closed, the selection unit 124 selects the second corrected data. On the other hand, when no abnormal pixel with reference to the preset condition is detected in the first corrected data in the state in which the shutter 901 is closed, the selection unit 124 selects the first corrected data.

The AGC processing unit 130 receives the imaging data from the pixel non-uniformity correction unit 120 and adjusts the contrast of the imaging data. The AGC processing unit 130 adjusts the contrast of the imaging data, to thereby generate an image which it is easy for a user to recognize when the thermal image is displayed on the monitor 902. Further, by adjusting the contrast of the imaging data, when the object recognition processing is performed on the thermal image, the AGC processing unit 130 can output a thermal image that is suitable for recognition processing. The AGC processing unit 130 uses, for example, a histogram equalization method such as contrast limitation adaptive histogram equalization for the imaging data.

The saturated region detection unit 140 receives imaging data from the defective pixel correction unit 110 and detects a saturated region from the received imaging data. The saturated region is a region in which a saturated pixel or a pixel substantially saturated is present. The saturated pixel refers to a pixel in a state in which the value of pixel data reaches an upper limit. For example, when a luminance level of each pixel of imaging data is expressed by 14 bits from 0 to 16383, a pixel of the coordinate in which a luminance level is 16383 is referred to as a saturated pixel.

For example, when the saturated region detection unit 140 detects that four or more adjacent pixels are saturated pixels, it determines that a saturated region is present. Alternatively, for example, when a luminance value of each of nine or more adjacent pixels is 98% or more of the upper limit of the luminance value, the saturated region detection unit 140 determines that a saturated region is present. When the saturated region detection unit 140 detects that a saturated region is present in the received imaging data, it supplies a signal indicating a result of the detection of the saturated region to the shutter control unit 150.

The shutter control unit 150 performs closing control for the shutter or opening control for the shutter in accordance with a result of detection of the saturated region. For example, when the saturated region detection unit 140 detects the saturated region, the shutter control unit 150 closes the shutter to protect the infrared imaging device. More specifically, the shutter control unit 150 is connected to the saturated region detection unit 140 and receives an instruction that the shutter 901 is to be closed from the saturated region detection unit 140. When the shutter control unit 150 receives the instruction that the shutter 901 is to be closed from the saturated region detection unit 140, it closes the shutter 901 in accordance with this instruction.

When the shutter control unit 150 receives the instruction that the shutter 901 is to be closed from the pixel non-uniformity correction unit 120, it closes the shutter 901 in accordance with such an instruction. When the shutter control unit 150 receives the instruction that the shutter 901 is to be opened from the pixel non-uniformity correction unit 120, it opens the shutter 901 in accordance with such an instruction. The shutter control unit 150 supplies the pixel non-uniformity correction unit 120 with a signal about the shutter-opened/closed state.

Further, when the selection unit 124 selects the first corrected data and the shutter control unit 150 receives the signal indicating the closing control for the shutter 901, it performs closing control for the shutter 901. Further alternatively, when the selection unit 124 selects the second corrected data and the shutter control unit 150 receives the signal indicating the closing control for the shutter 901, it prevents closing control for the shutter 901.

The image processing apparatus 100 has been described above. Next, an overview of each component connected to the image processing apparatus 100 will be described.

The microbolometer 900 is an embodiment of an infrared imaging device. The microbolometer 900 is composed of infrared detection elements arranged in a matrix. The infrared detection elements detect far-infrared rays. Further, the microbolometer 900 performs photoelectric conversion of the detected far-infrared rays to generate imaging data, and supplies the generated imaging data to the defective pixel correction unit 110 of the image processing apparatus 100.

The microbolometer 900 is mounted on a mobile body so that it captures a thermal image outside of the mobile body. When the mobile body is an automobile, for example, the microbolometer 900 is installed therein so as to face in the direction to the front of the automobile so that it can capture an image of the traveling direction of the automobile. However, it may instead be installed in the automobile so as to face in other directions.

The shutter 901 allows external light to enter the microbolometer 900 or prevents external light from entering it. These operations performed by the shutter 901 are controlled by the shutter control unit 150. When the shutter 901 is open, the shutter 901 allows external light to pass through it, and thus causes the microbolometer 900 to receive the external light. When the shutter 901 is closed, the shutter 901 blocks external light to protect the microbolometer 900 from the external light. Further, the shutter 901 has a function of calibrating the second correction table in the microbolometer 900.

The monitor 902 is a display apparatus installed so that it can present information to a user, and includes, for example, a liquid crystal panel or an organic Electro Luminescence (EL) panel. The monitor 902 is connected to the AGC processing unit 130 of the image processing apparatus 100, receives imaging data from the AGC processing unit 130, and displays the received imaging data. The monitor 902 may display the imaging data including an image showing a recognized person.

Figure 2:
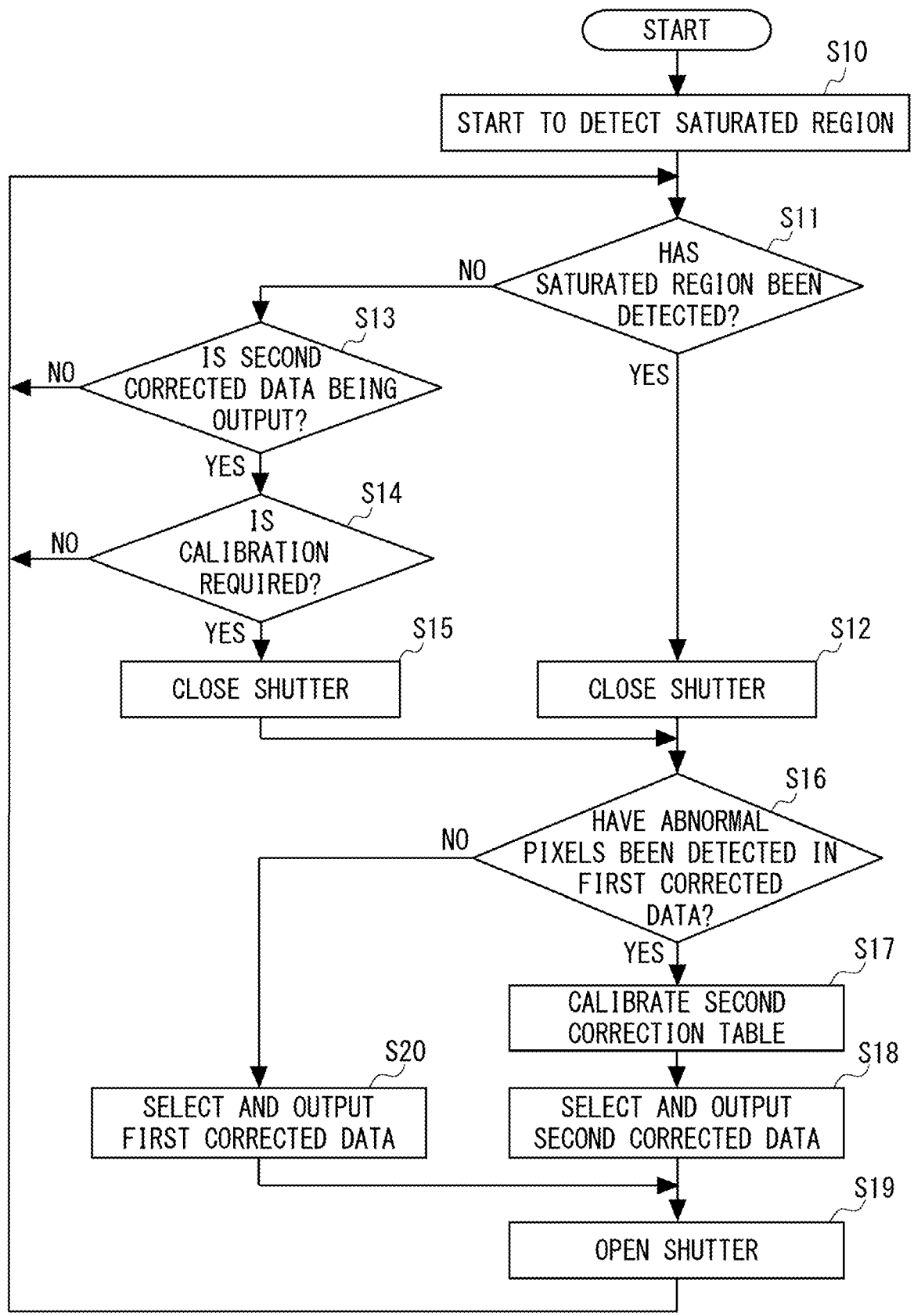
FIG. 2 is a flowchart showing an example of the processes of the image processing apparatus according to the first embodiment.

Next, referring to FIG. 2, processes executed by the image processing apparatus 100 will be described. FIG. 2 is a flowchart showing an example of the processes of the image processing apparatus according to the first embodiment. The flowchart shown in FIG. 2 is started when the image processing apparatus 100 receives imaging data from the microbolometer 900.

First, when the image processing apparatus 100 receives imaging data from the microbolometer 900, the saturated region detection unit 140 starts detection of a saturated region (Step S10). Next, the image processing apparatus 100 determines whether or not a saturated region has been detected in the imaging data (Step S11).

When the image processing apparatus 100 determines that a saturated region has been detected in the imaging data (Step S11: Yes), it closes the shutter 901 (Step S12). The image processing apparatus 100 then advances the process to Step S16. When the image processing apparatus 100 does not determine that a saturated region has been detected in the imaging data (Step S11: NO), it advances the process to Step S13.

In Step S13, the image processing apparatus 100 determines whether or not the pixel non-uniformity correction unit 120 is outputting the second corrected data (data on mechanical shutter correction) (Step S13). When it is determined that the pixel non-uniformity correction unit 120 is outputting the second corrected data (Step S13: YES), the image processing apparatus 100 advances the process to Step S14. When the pixel non-uniformity correction unit 120 is outputting the first corrected data, the image processing apparatus 100 does not determine that the pixel non-uniformity correction unit 120 is outputting the second corrected data (Step S13: NO). In this case, the image processing apparatus 100 returns the process to Step S11.

In Step S14, the second correction unit 122 of the image processing apparatus 100 determines whether calibration is required or not (Step S14). When the condition for calibrating the second correction table is satisfied, the second correction unit 122 determines that the calibration is required (Step S14: YES). In this case, the second correction unit 122 supplies the shutter control unit 150 with a signal for instruction to close the shutter 901. The shutter control unit 150 then closes the shutter 901 (Step S15). Further, the image processing apparatus 100 advances the process to Step S16. On the other hand, when the condition for performing mechanical shutter correction is not satisfied, the second correction unit 122 does not determine that calibration is required (Step S14: NO). In this case, the image processing apparatus 100 returns the process to Step S11.

In Step S16, the image processing apparatus 100 determines whether abnormal pixels have been detected in the first corrected data (imaging data having subjected to shutterless correction) or not (Step S16). More specifically, the selection unit 124 of the image processing apparatus 100 determines whether or not the signal received from the abnormal pixel detection unit 123 indicates that abnormal pixels have been detected. When the image processing apparatus 100 determines that abnormal pixels have been detected in the first corrected data (Step S16: Yes), it calibrates the second correction table (Step S17). The image processing apparatus 100 then advances the process to Step S18. On the other hand, when the image processing apparatus 100 does not determine that abnormal pixels have been detected in the first corrected data (Step S16: NO), it advances the process to Step S20.

The image processing apparatus 100 having advanced the process to Step S18 is set so as not to output the first corrected data including the abnormal pixels but output the second corrected data (imaging data having been subjected to mechanical shutter correction). That is, the selection unit 124 selects the second corrected data, and outputs the selected second corrected data to the AGC processing unit 130 (Step S18). The image processing apparatus 100 then advances the process to Step S19.

The image processing apparatus 100 having advanced the process to Step S20 is set to output the first corrected data including no abnormal pixel. That is, the selection unit 124 selects the first corrected data, and outputs the selected first corrected data to the AGC processing unit 130 (Step S20). The image processing apparatus 100 then advances the process to Step S19.

In Step S19, the shutter control unit 150 of the image processing apparatus 100 receives the instruction from the pixel non-uniformity correction unit 120 and opens the shutter (Step S19). The image processing apparatus 100 then returns the process to Step S11. The image processing apparatus 100 having returned the process to Step S11 repeats the above-described processes.

Figure 3:
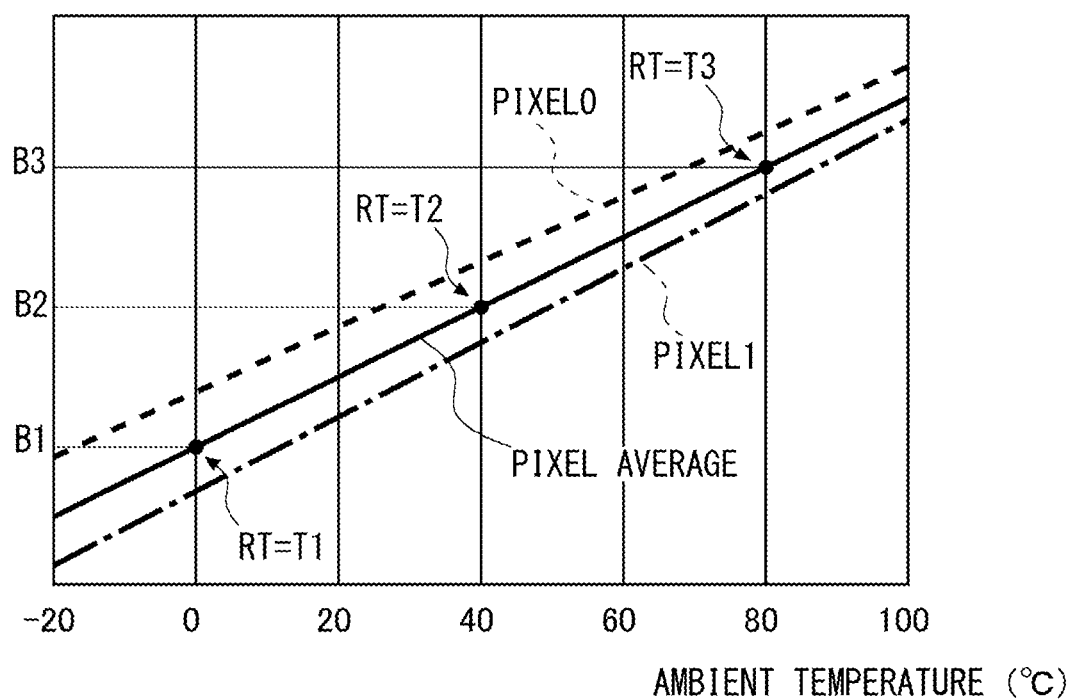
FIG. 3 shows an example of first correction reference data that a first correction unit has.

Next, referring to FIG. 3, an example of the shutterless correction performed by the first correction unit 121 will be described. FIG. 3 shows an example of first correction reference data that the first correction unit 121 has. In a graph shown in FIG. 3, the ordinate axis indicates the luminance value of the microbolometer, and the abscissa axis indicates the ambient temperature corresponding to the luminance value of the microbolometer. In the graph of FIG. 3, three pixel lines are plotted. These three lines indicate the relationships between output pixel values corresponding to the ambient temperatures of the microbolometer. The line indicated by a solid line indicates the relationship between the average luminance value in the captured image by the microbolometer and the ambient temperature. The lines respectively indicated by an alternate long and short dash line and a broken line indicate the relationship between the luminance value for a certain pixel by the microbolometer and the ambient temperature.

In the graph shown in FIG. 3, for example, when the temperature RT is T1, the image processing apparatus 100 saves, as a correction table 1, an offset value for each pixel calculated with reference to an average luminance value B1. Further, when the temperature RT is T2, the image processing apparatus 100 saves, as a correction table 2, an offset value for each pixel calculated with reference to a luminance value B2. Further, when the temperature RT is T3, the image processing apparatus 100 saves, as a correction table 3, an offset value for each pixel calculated with reference to a luminance value B3. Data items between the correction tables 1 and 2 and between the correction tables 2 and 3 are interpolated by an interpolation process, such as linear approximation or spline approximation. The first correction unit 121 monitors the temperature RT in the vicinity of the microbolometer, and sets an optimal correction table depending on the temperature RT. Accordingly, the first correction unit 121 can correct the imaging data without closing the shutter.

Note that the above-described relationship between the luminance value and the ambient temperature is inapplicable to cases in which the microbolometer receives sunlight. When the microbolometer receives sunlight, the luminance value at the pixel having received sunlight indicates an abnormal value. In this case, the imaging data cannot appropriately be corrected based on the above-described correction table. The image processing apparatus 100 considers the characteristics of such shutterless correction, and when abnormal pixels are included, this apparatus outputs the imaging data through mechanical shutter correction instead of imaging data through shutterless correction.

Note that in FIG. 3, for the sake of facilitating understanding, the three lines are indicated. In actuality, there are lines as many as the number of pixels of the microbolometer. The lines shown in FIG. 3 are straight lines. Alternatively, the lines of characteristics of pixels may be lines corresponding to polygonal lines or curved lines. The above-described correction tables may include finer correction tables or be a smaller number of tables. The graph shown in FIG. 3 is an example for illustrating the principle of the first correction unit.

Figure 4:
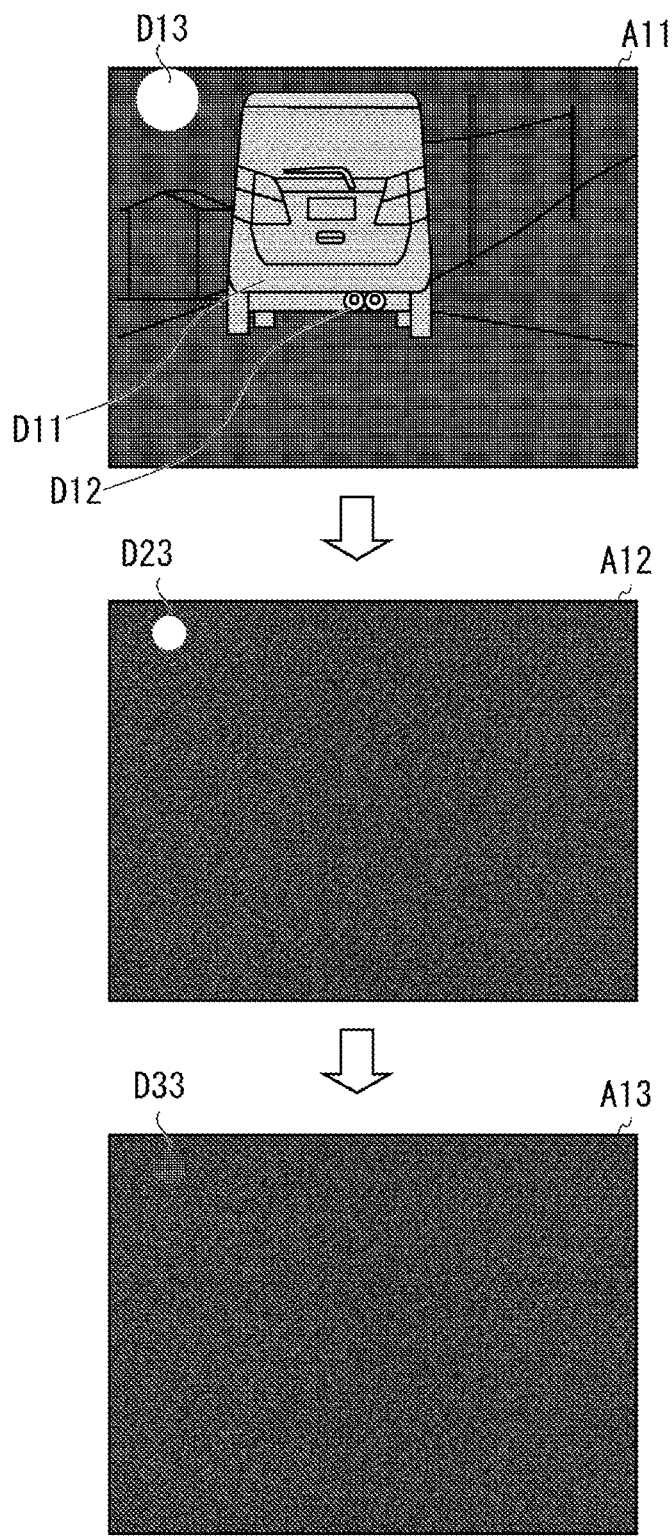
FIG. 4 shows a first example of processes of the image processing apparatus.

Next, the processes of the image processing apparatus 100 will be described with a specific example. FIG. 4 shows a first example of processes of the image processing apparatus. FIG. 4 includes, from the top, a thermal image A11, a thermal image A12 and a thermal image A13. The thermal image A11 is an example of an image included in imaging data received by the image processing apparatus 100 from the microbolometer 900. The thermal image A11 is an image captured in the traveling direction of a vehicle mounted with the thermal image display system 10. The thermal image A11 includes an image of another vehicle D11. The other vehicle D11 includes a muffler D12. The thermal image A11 includes, in addition to the other vehicle D11, an image of the sun D13 at the top left of the image.

In the thermal image A11, since an electromagnetic wave radiated by an object is detected, a part of the thermal image A11 where heat is high is brightly displayed. Therefore, in the thermal image A11, the other vehicle D11 is displayed relatively brighter than a background image. Further, in the other vehicle D11, the color of the muffler D12 having a particularly high temperature is displayed in white. Since the sun D13 has a high temperature, the color of it is displayed in white. The luminances of the muffler D12 and the sun D13 displayed in white in the thermal image A11 are in a saturated state. Since the thermal image A11 includes a saturated region, the image processing apparatus 100 shuts the shutter 901.

The thermal image A12 shown below the thermal image A11 is a thermal image pertaining to imaging data acquired in the state in which the shutter 901 is closed. The thermal image A12 includes an abnormal pixel group D23. The abnormal pixel group D23 has been caused by imaging the sun D13 indicated in the thermal image A11. Since the abnormal pixel group D23 is subjected to correction based on the preset first correction table, this group is not corrected in the first corrected data either. Therefore, the image processing apparatus 100 selects output of the second corrected data, for the thermal image A12 including the abnormal pixel group D23.

The thermal image A13 indicated below the thermal image A12 is in a state in which the thermal image A12 has been corrected by the second correction unit 122. That is, the thermal image A13 pertains to the second corrected data concerning the imaging data that includes abnormal pixels. The second correction table is a generated correction table concerning the imaging data including abnormal pixels. Accordingly, the thermal image A13 includes a corrected pixel group D33. The corrected pixel group D33 is changed from white to dark gray by second correction.

As described above, when the imaging data includes abnormal pixels, the image processing apparatus 100 selects and outputs the second corrected data. Accordingly, the image processing apparatus 100 can reduce image quality degradation due to abnormal pixels.

Figure 5:
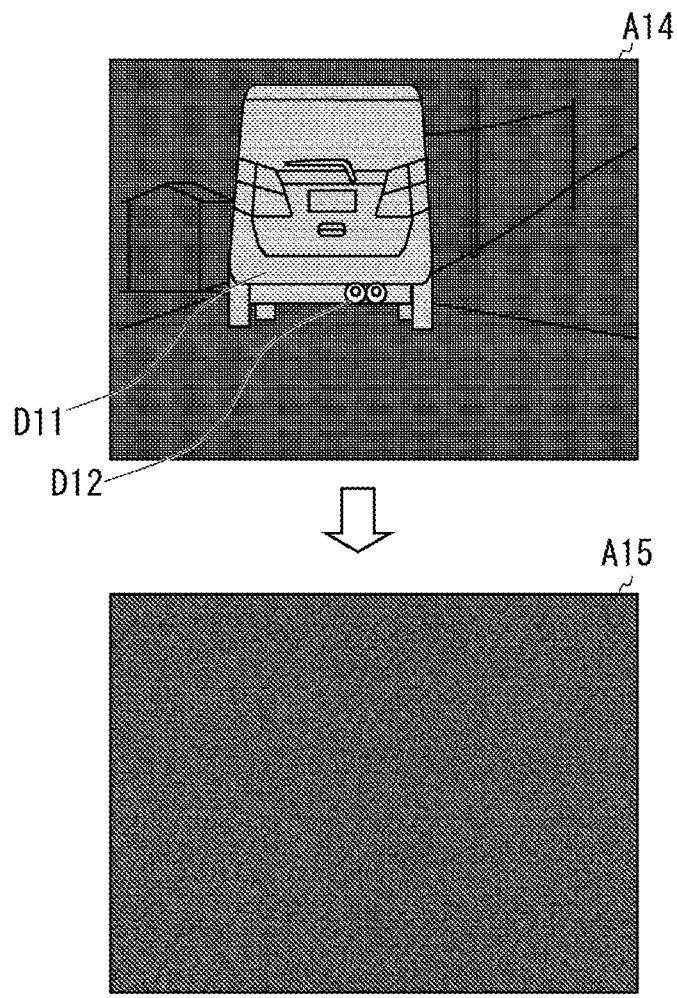
FIG. 5 shows a second example of processes of the image processing apparatus.

Next, referring to FIG. 5, another example of processes executed by the image processing apparatus 100 will be described. FIG. 5 shows a second example of processes of the image processing apparatus. FIG. 5 includes, from the top, a thermal image A14 and a thermal image A15. The thermal image A14 is an example of an image included in imaging data received by the image processing apparatus 100 from the microbolometer 900. The thermal image A14 is an image captured in the traveling direction of a vehicle mounted with the thermal image display system 10. The thermal image A14 includes an image of another vehicle D11. The other vehicle D11 includes a muffler D12. Note that the thermal image A14 is different from the thermal image A11 shown in FIG. 4 in that the thermal image A14 includes no image of the sun.

In the thermal image A14, the color of the muffler D12 in the other vehicle D11 that has a particularly high temperature is displayed in white. That is, the luminance of the muffler D12 displayed in white in the thermal image A14 is in the saturated state. Since the thermal image A14 includes a saturated region, the image processing apparatus 100 shuts the shutter 901.

The thermal image A15 indicated below the thermal image A14 is a thermal image pertaining to imaging data acquired in the state in which the shutter 901 is closed. The thermal image A15 includes no abnormal pixel group. Therefore, the image processing apparatus 100 selects output of the first corrected data, for the thermal image A14.

As described above, when the imaging data includes no abnormal pixel, the image processing apparatus 100 selects and outputs the first corrected data. While the image processing apparatus 100 outputs the first corrected data, it does not update the second correction table pertaining to the second corrected data in the second correction unit. In other words, while the image processing apparatus 100 outputs the first corrected data, it does not perform the operation of closing the shutter 901 as an operation for updating the second corrected data. The image processing apparatus 100 can thus reduce interruption of the sensor function.

The first embodiment has thus been described above. The image processing apparatus 100 according to the first embodiment executes the first correction and the second correction in parallel, and outputs the first corrected data when no abnormal pixel is included, and outputs the second corrected data when abnormal pixels are included. While the image processing apparatus 100 outputs the first corrected data, it does not perform the operation of closing the shutter 901 for updating the second corrected table. That is, according to the first embodiment, it is possible to provide the image processing apparatus and the like that reduce image quality degradation and reduce interruption of the sensor function.

Second Embodiment

Figure 6:
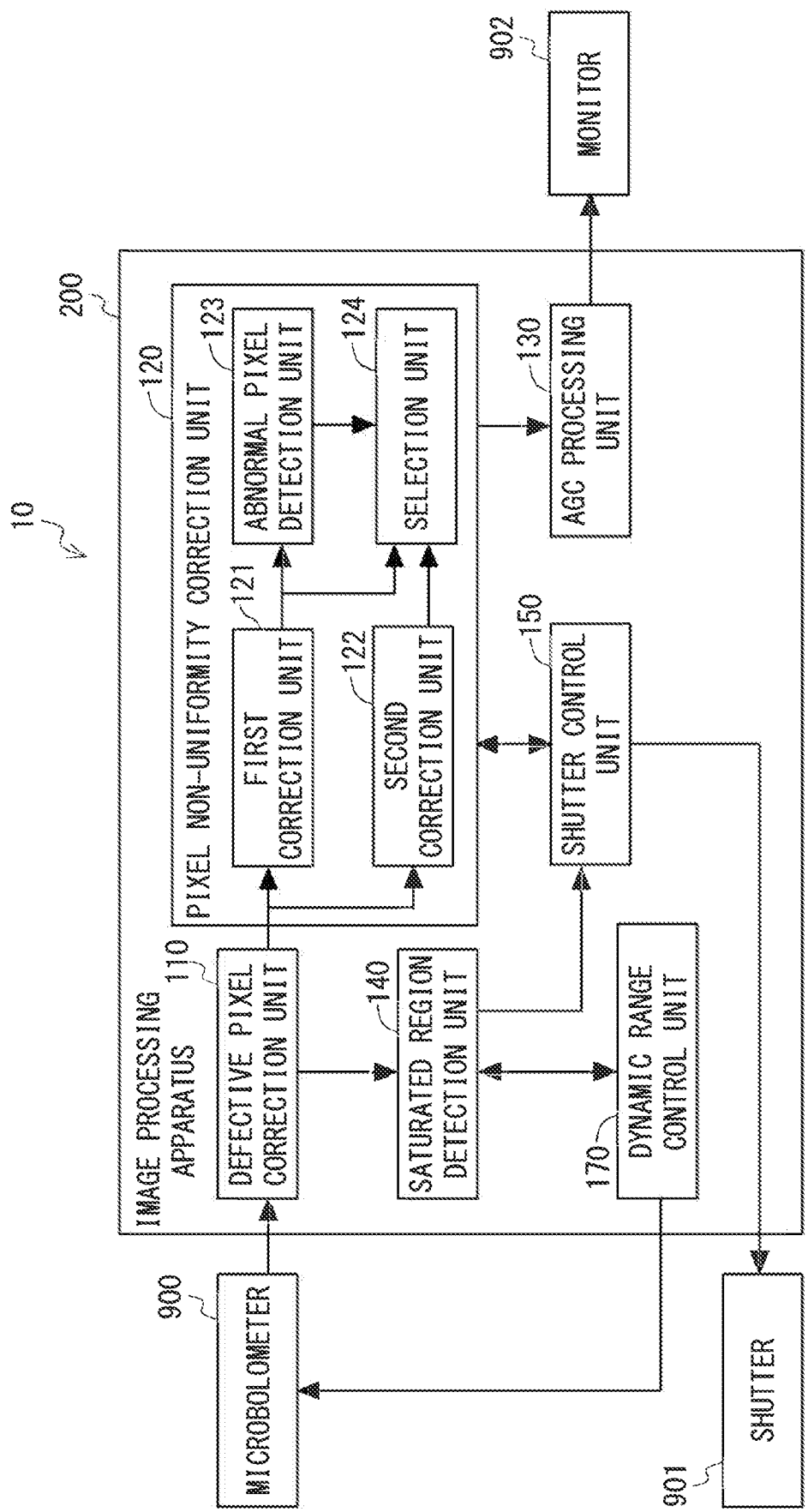
FIG. 6 is a block diagram of an image processing apparatus according to a second embodiment.

Next, a second embodiment will be described. An image processing apparatus according to a second embodiment is different from the image processing apparatus of the first embodiment in that the apparatus of the second embodiment controls the dynamic range of the microbolometer. FIG. 6 is a block diagram of an image processing apparatus according to the second embodiment.

A thermal image display system 10 shown in FIG. 6 includes an image processing apparatus 200 instead of the image processing apparatus 100. The image processing apparatus 200 is different from the image processing apparatus 100 in that the image processing apparatus 200 mainly includes a dynamic range control unit 170.

The dynamic range control unit 170, in cooperation with the saturated region detection unit 140, sets the dynamic range of the microbolometer to a first temperature range or a second temperature range in which the temperature on at least the upper limit side is higher than that of the first temperature range in accordance with the result of the detection of the saturated region. The dynamic range control unit 170 is connected to the saturated region detection unit 140 and receives a signal indicating that a saturated region has been detected. Further, the dynamic range control unit 170 is connected to the microbolometer 900 and supplies a signal for instructing that the dynamic range is to be set. Note that the dynamic range in this embodiment may also be referred to as a "scene dynamic range".

More specifically, for example, when the dynamic range is set to the first temperature range and the saturated region detection unit 140 detects a saturated region, the dynamic range control unit 170 changes the setting of the dynamic range from the first temperature range to the second temperature range. Further, for example, when the dynamic range is set to the second temperature range and the saturated region detection unit 140 does not detect a saturated region, the dynamic range control unit 170 changes the setting of the dynamic range from the second temperature range to the first temperature range.

Note that when the dynamic range control unit 170 performs processing for setting the dynamic range to the first temperature range and the second temperature range, the dynamic range control unit 170, for example, changes the setting of an integration time of the microbolometer 900. The microbolometer 900 changes the exposure time by changing the setting of the integration time. When the integration time becomes relatively short, the dynamic range of a signal output from the microbolometer 900 becomes relatively wide. That is, when the dynamic range is changed from the first temperature range to the second temperature range, the dynamic range control unit 170 sends an instruction to the microbolometer 900 to reduce the integration time.

Note that the instruction about the dynamic range may be an instruction about the setting of gain instead of the setting of the integration time. In a case in which the gain is set, when the dynamic range is changed from the first temperature range to the second temperature range, the dynamic range control unit 170 sends an instruction to the microbolometer 900 to reduce the gain.

Further, the saturated region detection unit 140 in this embodiment acquires information about the setting of the dynamic range from the dynamic range control unit 170. The information about the setting of the dynamic range includes information indicating whether the dynamic range set in the microbolometer 900 is set to the first temperature range or the second temperature range. The first temperature range is set so that, for example, a temperature range detected by the microbolometer is 10 to 50 degrees. The second temperature range is a range in which the upper limit is set higher than that of the first temperature range, and is set so that, for example, a temperature range detected by the microbolometer is 10 to 200 degrees. When the dynamic range is set to the second temperature range and the saturated region detection unit 140 detects the above-described saturated region in the acquired imaging data, the saturated region detection unit 140 supplies a signal for instructing that the shutter is to be closed to the shutter control unit 150.

Figure 7:
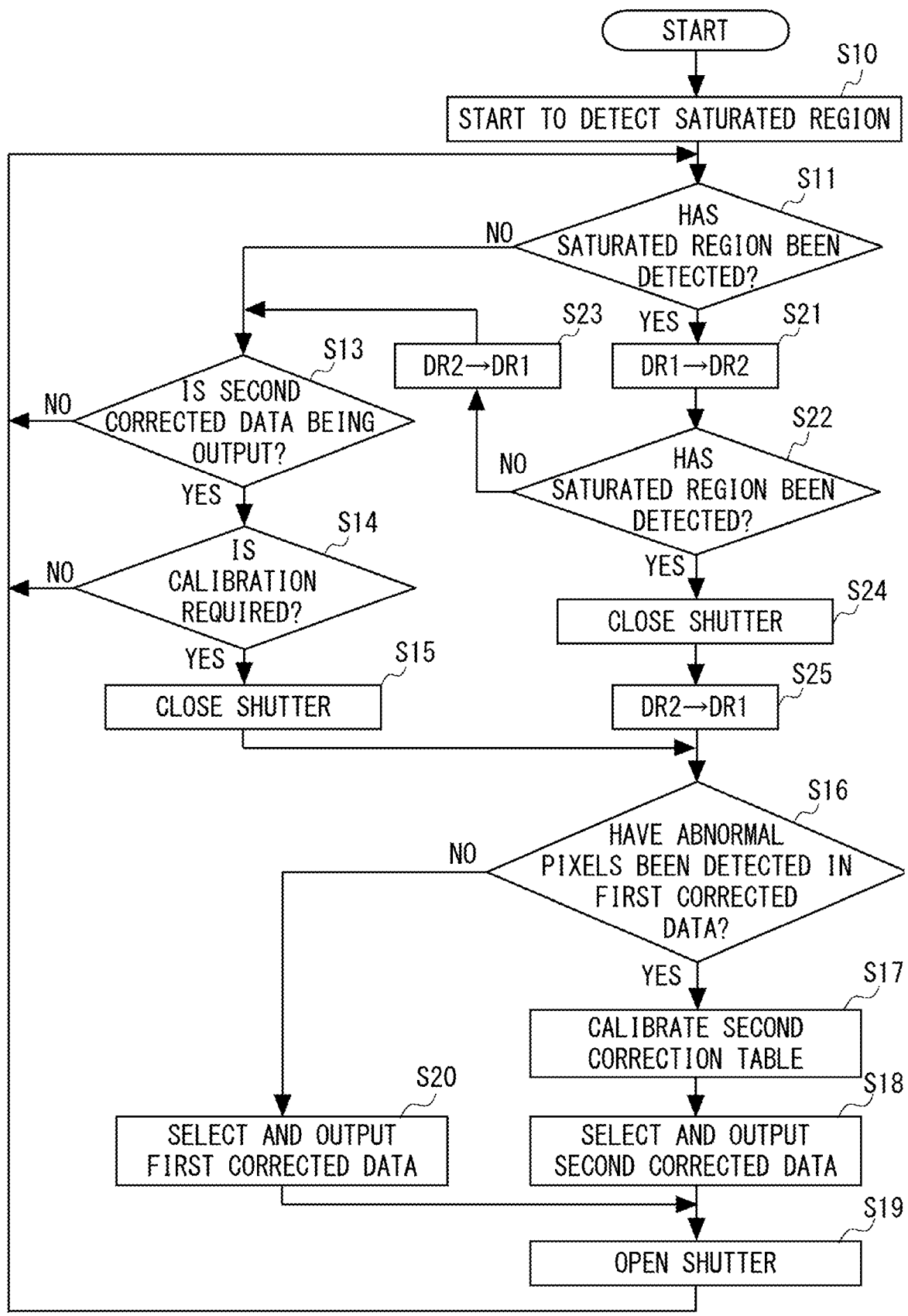
FIG. 7 is a flowchart showing an example of the processes of the image processing apparatus according to the second embodiment.

Next, referring to FIG. 7, processes performed by the image processing apparatus 200 will be described. FIG. 7 is a flowchart showing an example of the processes of the image processing apparatus according to the second embodiment. The flowchart shown in FIG. 7 is different from the flowchart according to the first embodiment in the processes after Step S11 and before Step S16. Hereinafter, the points different from those of the flowchart according to the first embodiment will be mainly described. Note that for explanatory convenience, in the following description, the first temperature range set by the dynamic range control unit 170 is referred to as DR1, and the second temperature range is referred to as DR2.

If the saturated region is detected in Step S11 (Step S11: YES), the image processing apparatus 200 allows the dynamic range control unit 170 to change the setting of the dynamic range from the first temperature range (DR1) to the second temperature range (DR2) (Step S21). The saturated region detection unit 140 of the image processing apparatus 200 determines whether or not to detect a saturated region in the imaging data with the dynamic range having been changed to DR2 (Step S22).

If it is determined that a saturated region is detected in imaging data with DR2 (Step S22: YES), the image processing apparatus 200 closes the shutter 901 (Step S24), further changes the setting of the dynamic range from DR2 to DR1 (Step S25) and advances the process to Step S16. On the other hand, if it is not determined that a saturated region has been detected in the imaging data with DR2 (Step S22: NO), the image processing apparatus 100 changes the setting of the dynamic range from DR2 to DR1 (Step S23) and further advances the process to Step S13. The processes thereafter are similar to those of the flowchart according to the first embodiment.

The second embodiment has thus been described. According to the above-described configuration, when the setting of the dynamic range is the first temperature range, the image processing apparatus 200 does not perform control of shutting the shutter, and changes the setting of the dynamic range from the first temperature range to the second temperature range. When a saturated region is detected in the imaging data acquired from the microbolometer set to the second temperature range, the image processing apparatus 200 performs control of closing the shutter 901. Therefore, the image processing apparatus 200 can prevent the operation of closing the shutter when a saturated region is detected. Therefore, the image processing apparatus 200 can reduce interruption of the sensor function. Consequently, according to the second embodiment, it is possible to provide the image processing apparatus and the like that reduce image quality degradation and reduce interruption of the sensor function.

Note that the above-described program can be stored and provided to a computer using any type of non-transitory computer readable media. The non-transitory computer readable media includes any type of tangible storage media. Examples of the non-transitory computer readable media include magnetic storage media (such as flexible disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of the transitory computer readable media include electric signals, optical signals, and electromagnetic waves. The transitory computer readable media can provide the program to a computer via a wired communication line such as an electric wire and an optical fiber, or a wireless communication line.

Note that the present invention is not limited to the above-described embodiments and may be changed as appropriate without departing from the spirit of the present invention. For example, the image processing apparatus can be applied not only to an automobile but also to a mobile body such as a motorcycle, a ship, an airplane, a mobile robot, and a drone.

What is claimed is:

1. An image processing apparatus comprising:
a first correction unit configured to correct imaging data acquired from an infrared imaging device that captures a thermal image outside of a mobile body, based on a preset first correction table, and output first corrected data having been corrected;
a second correction unit configured to generate a second correction table for the imaging data in a state in which a shutter is closed, and output second corrected data having been corrected based on the generated second correction table;
a saturated region detection unit configured to detect that a saturated region is present in the imaging data;
a shutter control unit configured to perform closing control for the shutter for protecting the infrared imaging device based on a result of detection of the saturated region;
an abnormal pixel detection unit configured to detect whether or not the imaging data acquired in the state in which the shutter is closed includes an abnormal pixel that is included in the first corrected data and pertains to a pixel having a luminance value exceeding a preset threshold; and
a selection unit configured to select and output either the first corrected data or the second corrected data in accordance with a result of detection by the abnormal pixel detection unit.

2. The image processing apparatus according to claim 1, wherein the selection unit selects the first corrected data or the second corrected data in accordance with whether or not the luminance value of the abnormal pixel included in the first corrected data concerning the imaging data captured in the state in which the shutter is closed exceeds a threshold.

3. The image processing apparatus according to claim 1, wherein
the second correction unit supplies the shutter control unit with a signal for instruction in the closing control for the shutter, based on a preset calibration condition, and
when the selection unit selects the first corrected data and the shutter control unit receives the signal for instruction in the closing control for the shutter, the shutter control unit performs the closing control for the shutter, and when the selection unit selects the second corrected data and the shutter control unit receives the signal for instruction in the closing control for the shutter, the shutter control unit prevents the closing control of the shutter.

4. An image processing method comprising:
a first correction step of correcting imaging data acquired from an infrared imaging device that captures a thermal image outside of a mobile body, based on a preset first correction table, and outputting first corrected data having been corrected;
a second correction step of generating a second correction table for the imaging data in a state in which a shutter is closed, and outputting second corrected data having been corrected based on the generated second correction table;
a saturated region detection step of detecting that a saturated region is present in the imaging data;
a shutter control step of performing closing control for the shutter for protecting the infrared imaging device based on a result of detection of the saturated region;
an abnormal pixel detection step of detecting whether or not the imaging data acquired in the state in which the shutter is closed includes an abnormal pixel that is a pixel having a luminance value exceeding a preset threshold; and
a selection step of selecting and outputting either the first corrected data or the second corrected data in accordance with a result of detection in the abnormal pixel detection step.

5. A non-transitory computer readable medium storing a program causing a computer to execute an image processing method comprising:
a first correction step of correcting imaging data acquired from an infrared imaging device that captures a thermal image outside of a mobile body, based on a preset first correction table, and outputting first corrected data having been corrected;
a second correction step of generating a second correction table for the imaging data in a state in which a shutter is closed, and outputting second corrected data having been corrected based on the generated second correction table;
a saturated region detection step of detecting that a saturated region is present in the imaging data;
a shutter control step of performing closing control for the shutter for protecting the infrared imaging device based on a result of detection of the saturated region;
an abnormal pixel detection step of detecting whether or not the imaging data acquired in the state in which the shutter is closed includes an abnormal pixel that is a pixel having a luminance value exceeding a preset threshold; and
a selection step of selecting and outputting either the first corrected data or the second corrected data in accordance with a result of detection in the abnormal pixel detection step.

* * * * *